United States Patent [19]

Kawata et al.

[11] Patent Number: 4,844,680
[45] Date of Patent: Jul. 4, 1989

[54] AUTOMATIC ARTICLE FEEDING APPARATUS

[75] Inventors: Hideaki Kawata, Tokyo; Yusaku Azuma, Kanagawa; Kenzi Kuroki; Osamu Shigematsu, both of Ibaraki, all of Japan

[73] Assignee: Canon Kabushiki Kaisha, Tokyo, Japan

[21] Appl. No.: 887,130

[22] Filed: Jul. 17, 1986

[30] Foreign Application Priority Data

Jul. 19, 1985 [JP] Japan ................................ 60-159610

[51] Int. Cl.⁴ .............................................. B65G 1/00
[52] U.S. Cl. .................................. 414/331; 414/282; 414/286; 414/661
[58] Field of Search ............... 414/278, 280, 281, 282, 414/286, 331, 395, 659, 661, 416

[56] References Cited

U.S. PATENT DOCUMENTS

| | | |
|---|---|---|
| 3,526,326 | 9/1970 | Castaldi . |
| 3,809,259 | 5/1974 | Pipes .................................. 414/281 X |
| 3,850,316 | 11/1974 | Schmitt ............................. 414/280 X |
| 4,595,330 | 6/1986 | O'Brien et al. ................... 414/286 X |
| 4,626,160 | 12/1986 | Shiomi et al. ......................... 414/222 |
| 4,632,624 | 12/1986 | Mirkovich et al. ............. 414/222 X |

FOREIGN PATENT DOCUMENTS

| | | |
|---|---|---|
| 8752 | 2/1974 | Japan . |
| 26391 | 7/1977 | Japan . |
| 54-1750 | 1/1979 | Japan . |
| 28665 | 7/1980 | Japan . |
| 61205 | 5/1981 | Japan .................................. 414/281 |
| 59-4502 | 1/1984 | Japan . |
| 14582 | 1/1984 | Japan .................................. 414/222 |
| 118545 | 6/1985 | Japan .................................. 414/222 |

Primary Examiner—Kenneth J. Dorner
Assistant Examiner—Thomas A. Rendos
Attorney, Agent, or Firm—Fitzpatrick, Cella, Harper & Scinto

[57] ABSTRACT

An automatic article feeding apparatus which includes a stocker for housing pallets for containing articles such as parts for assembly, interchangeable tools or the like, a first pallet operating device for transferring the pallets from the stocker to an automatic assembling machine and vice versa, a second pallet operating device for feeding the loaded pallets containing the articles to said stocker and discharging the empty pallets to the outside, and control means for controlling the operations of the pallet operating devices in accordance with the actuation of said automatic assembling machine and the signals indicating the position of the loaded pallet housed in said stocker and the empty portion in said stocker.

9 Claims, 3 Drawing Sheets

AUTOMATIC ARTICLE FEEDING APPARATUS

BACKGROUND OF THE INVENTION

1. Field of the Invention

The present invention relates to an automatic feeding apparatus for feeding articles to an automatic article processing machine, such as a robot, and, particularly, it relates to an automatic feeding apparatus for feeding parts for assembly or interchangeable robot hands to a assembling robot.

2. Description of the Related Art

Recently, rapid advances have been made in automatic assembling techniques and, accordingly, many articles have become manufactured in an automatic assembling system.

With reference to conveying method of products during assembly, the automatic assembling equipment can be classified into a line production system and a non-line production system. The line production system consists of a line for conveying products during assembly and a plurality of automatic assembling machines arranged along said conveying line, as well known in the art. The line production system is mainly used in the process in which large quantity of production and great number of assembling steps are involved and equipment investment can be greatly increased.

The non-line production system is mainly used, for example, when the quantity of production is small, when the product is not adaptable to a conveyor system, when relatively small number of assembling steps are involved, or when it is not preferable to greatly increase the equipment investment.

In case of the automatic assembling equipment according to the line production system, which is frequently used in mass-production system, the speed of conveying products during assembly is high and, consequently, the automatic assembling machines arranged along the assembly line are mainly constructed of high-speed and single-function machines.

On the other hand, in case of the automatic assembling equipment according to the non-line production system, which includes no conveying line for conveying products during assembly or a very short length of such conveying line, if any, the automatic assembling equipment used is frequently constructed of a robot which can effect various kinds of operations. The automatic assembling equipment according to this system has some advantages. That is, many different kinds of products can be assembled by the same equipment if a software used to control the robot is changed, depending upon the product to be assembled, and the floor space occupied by the equipment can be decreased, as compared with the line production system. Accordingly, the automatic assembling equipment according to the non-line production system is suitable to production of small quantity and many kinds of articles. In order to adapt this equipment to production of large quantity and many kinds of articles it is necessary to feed many kinds of parts for assembly to one robot, with the result that it is necessary to arrange great number of feeding apparatus for feeding parts for assembly around said one robot. Accordingly, circumstances surrounding said robot get confused, and the floor space occupied by the equipment and the overall size of the equipment are increased owing to the existence of many feeding apparatus.

As one of the measures for solving such problems, an automatic assembling apparatus has been proposed, which includes carriers movable on conveying paths arranged around an automatic assembling machine, wherein the parts for assembly and/or interchangeable assembling tools are manually loaded on said carriers at remote locations and conveyed into the automatic assembling machine by means of said carriers (see Japanese Laid-Open Utility Model Application No. 4330/1973). In this automatic assembling equipment, it is unnecessary to arrange many feeding apparatus around the automatic assembling machine, so that circumstances surrounding the automatic assembling machine does not get confused and the increase of the overall size of the equipment can be avoided to some extent.

This type of automatic assembling equipment, however, cannot be well adapted to a mixed-flow assembling process for assembling intermediate size and small size lots in which the kinds of products for assembly and the number of assembling steps make successive changes. This is because the loading of the parts for assembly and/or the interchangeable assembling tools onto the carriers requires complicated operation and the working efficiency is considerably decreased. Furthermore, the feeding of the parts for assembly to the automatic assembling machine is effected by the carriers flowing on the conveying paths, so that the working efficiency is low, and the conveying paths require their own floor spaces, so that the overall size of the equipment cannot be decreased beyond a predetermined limit size. This automatic assembling equipment has a further disadvantage in that the parts for assembly are previously set onto the carriers manually in a predetermined process, so that the parts for assembly which have been fed from the respective manufacturing stations must be reloaded onto the carriers in any process, that requires troublesome operations.

SUMMARY OF THE INVENTION

It is an object of the present invention to solve the above-mentioned problems involved in the prior arts and provide an automatic feeding apparatus for feeding articles to realize an automatic assembling equipment which has high working efficiency and which is adaptable to mixed-flow production of intermediate size and small size lots, in which containers containing parts for assembly are fed to and discharged from a region for effecting assembling, processing or the like operation in which an interchangeable robot hand is included.

The other objects of the present invention will be understood from the descriptions of a preferred embodiment of the invention with reference to the accompanying drawings.

DETAILED DESCRIPTION OF THE PREFERRED EMBODIMENT

Now, a preferred embodiment of the present invention will be explained, with reference to the accompanying drawings.

Figure 1:
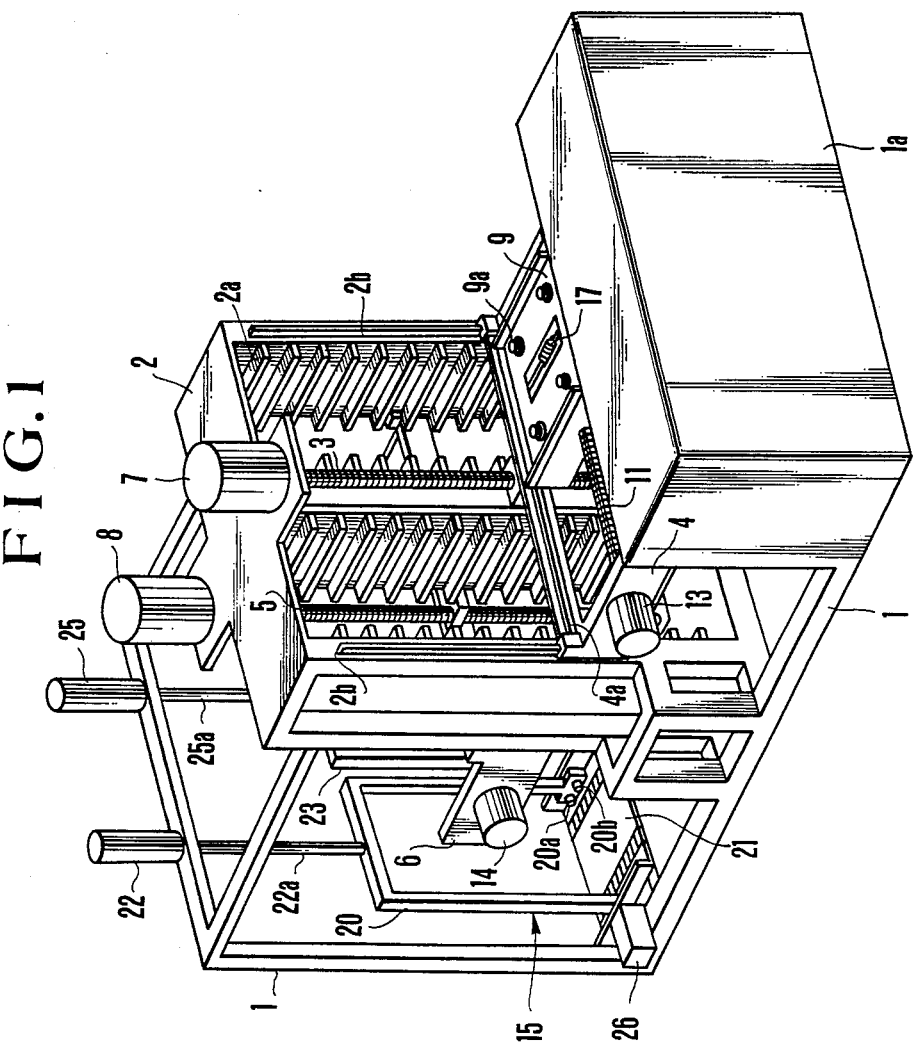
FIG. 1 is a perspective view showing an embodiment of the automatic feeding apparatus according to the present invention.
Figure 2:
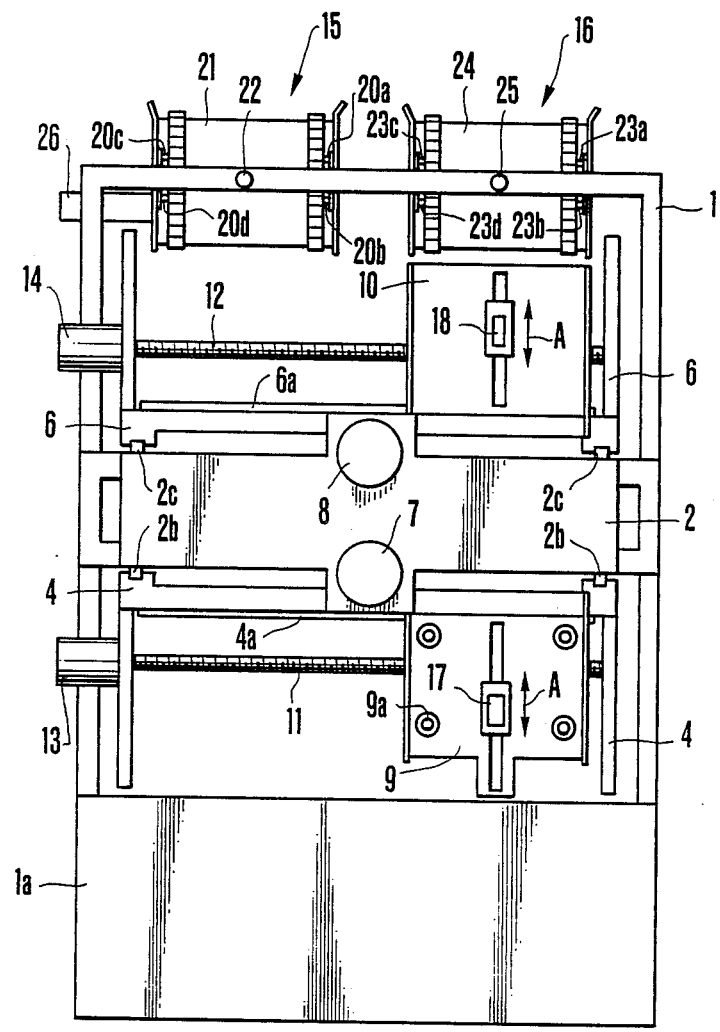
FIG. 2 is a plan view of the apparatus shown in FIG. 1.

In FIGS. 1 and 2, the numeral 1 designates a frame and the numeral 2 designates a stocker which is arranged at substantially central position of said frame 1. The stocker 2 includes a plurality of shelves 2a. A first vertically movable platform 4 which can be moved in upward or downward direction by means of a feed screw 3 is arranged at one opening portion of the stocker 2, while a second vertically movable platform 6 which can be moved in upward or downward direction by means of a feed screw 5 is arranged at the other opening portion of said stocker 2 (FIG. 1). Motors 7 and 8 for driving the feed screws 3 and 5, respectively, are arranged on the top plate of said stocker 2, and guide rails 2b and 2c for guiding the first and second movable stations 4 and 6 are arranged on both said edges of the opening portions of said stocker 2 (FIG. 2). The first and second vertically movable platforms 4 and 6 have female screw portions formed thereon which are held in threaded engagement with the feed screws 3 and 5, respectively. Said platforms 4 and 6 have portions which are slidable along said guide rails 2b and 2c and guided thereby. Thus, the first and second vertically movable platforms 4 and 6 are moved in upward or downward direction by the motors 7 and 8, respectively.

The platforms 4 and 6 have tables 9 and 10 movably mounted thereon, respectively, and these tables are horizontally movable along the opening portions of the stocker 2. The platforms 4 and 6 further include guide rails 4a and 6a for guiding said tables 9 and 10, respectively, feed screws 11 and 12 for moving said tables 9 and 10, respectively, and motors 13 and 14 for driving said feed screws 11 and 12, respectively.

A bench 1a is arranged at one side of the first vertically movable platform 4 opposite to its side confronting to the stocker 2. A robot (not shown) is mounted on said bench to effect the assembling operation of the parts for assembly.

A pallet feeding device 15 for feeding loaded pallets, in which parts for assembly have been already loaded, onto the table 10 is arranged at one side of the second vertically movable platform 6 opposite to its side confronting to the stocker 2 and a pallet discharging device 16 for receiving empty pallets from said table 10 is arranged at the same side of the second vertically movable platform 6.

The tables 9 and 10 have pallet transferring devices 17 and 18, respectively, which are movable in the direction at right angle to the feed screws 11 and 12 as shown by the arrows A in FIG. 2. These pallet transferring devices 17 and 18 serve to transfer the pallets between the stocker 2 and said tables 9 and 10, between the table 10 and the pallet feeding device 15 and between the table 10 and the pallet discharging device 16.

The vertically movable platforms, the tables and the pallet transferring devices constitute pallet operating devices. More particularly, the first vertically movable platform 4, the first table 9 and the first pallet transferring device 17 constitute the first pallet operating device, which is arranged at one opening portion of the stocker 2, while the second vertically movable platform 6, the second table 10 and the second pallet transferring device 18 constitute the second pallet operating device, which is arranged at the other opening portion of the stocker 2.

Figure 3:
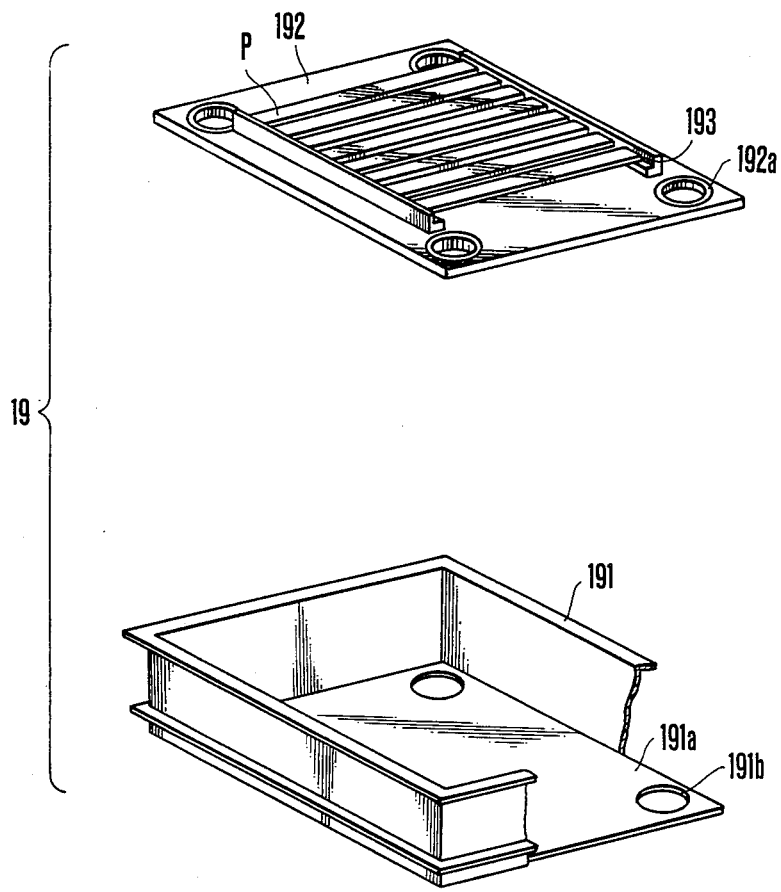
FIG. 3 is an exploded perspective view showing a pallet used in the apparatus shown in FIG. 1.

The detailed construction of the pallet 19 to be housed in the stocker 2 is shown in FIG. 3. As shown in FIG. 3, the pallet 19 consists of a box-like casing 191 and a magazine 192 housed in said casing, and said magazine 192 has positioning members 193 for positioning the parts for assembly p. The casing 191 has a bottom plate 191a. The bottom plate 191a and the magazine 192 have positioning through-holes 191b and 192a, respectively. The table 9 has pins 9a which are arranged to be projected upwardly to fit into said holes 191b and 192a.

The pallet feeding device 15 includes a pallet separating mechanism and a pallet supporting base 21 and serves to separate a pallet from a stack of the pallets placed on said base 21 and transfer the pallets one by one from the lowermost pallet onto the table 10. The pallet separating mechanism includes a vertically movable frame 20 and an air cylinder 22 having a rod 22a connected to said vertically movable frame 20. The vertically movable frame 20 has engaging pins 20a, 20b and 20c, 20d which are arranged at the both ends of said vertically movable frame 20, respectively. These engaging pins are retractable under the action of actuating cylinders or the like. The air cylinder 22 is fixed on the top of the frame 1 and the pallet supporting base 21 is fixed on the bottom of the frame 1. A pair of pallet conveyor belts are arranged on the pallet supporting base 21.

The pallet discharging device 16 includes a pallet separating mechanism and a pallet supporting base 24, in the same manner as in the pallet feeding device 15. The pallet discharging device 16 serves to place the pallets one on the other on the pallet supporting base 24. The pallet separating device includes a vertically movable frame 23 and an air cylinder 25 having a rod 25a connected to said vertically movable frame 23 to vertically move said frame 23. The vertically movable frame 23 has engaging pins 23a, 23b and 23c, 23d which are arranged at the both ends of said vertically movable frame, respectively. The air cylinder 25 is fixed on the top of the frame 1 and the pallet supporting base 24 is fixed on the top of the frame 1. A pair of pallet conveyor belts are arranged on the pallet supporting base 24.

A detector 26 (for example a bar code reader) is arranged at the side of the pallet supporting base 21 of the pallet feeding device 15 to effect identification of the content of the pallet and the output signal of said detector is fed to an information processing device for controlling the feeding apparatus according to the present invention and the robot. The information processing device serves to control the motors 7, 8, 13 and 14, the air cylinders 22 and 25, the pallet transferring devices 17 and 18, etc., in accordance with the input signals fed from various detectors arranged at the various points of the feeding apparatus according to the present invention (for example, the signals fed from the pallet detector arranged in the stocker and the input signals fed from the robot control device, etc.).

Now, the operations of the respective portions of the feeding apparatus according to the present invention will be explained.

Firstly, a required number of the pallets, in which the parts for assembly and/or the interchangeable tools for the robot have been loaded, are stacked on the pallet supporting base 21 of the pallet feeding device 15. In this regard it is to be noted that the pallet 19, in which the parts for assembly, the interchangeable robot hand and the like are loaded, is used as a shipping case of the parts for assembly.

The table 10 is moved to the position at the same level as that of the pallet supporting base 21. The pallets placed one on the other on the base 21 are separated one by one by the above-mentioned pallet separating mechanism and successively transferred onto the table 10. The pallet separating and transferring operation is effected as explained below. Firstly the engaging pins 20a, 20b and 20c, 20d are projected so that they come into engagement with the second pallet from bottom of the stack of the pallets and then the vertically movable frame 20 is moved upwardly by the action of the air cylinder 22. Thus the lowermost pallet of the stack is remained on the base 21 and it is transferred onto the table 10 by the action of the conveyor belts. Then, the table 10 and the vertically movable platform 6 are moved by the command signal fed from the above-mentioned information processing device, and when said pallet is positioned at the position corresponding to an empty shelf 2a in the stocker 2, the pallet transferring device 18 acts to urge said pallet into the shelf of the stocker 2. Thus the pallet becomes housed in the stocker 2.

A plurality of pallets which have been moved upwardly by the action of the air cylinder 22 are lowered and then the engaging pins 20a, 20b and 20c, 20d are retracted, so that the pallets become supported again on the pallet supporting base. Then, the table 10 is moved to the position at the same level as that of the pallet supporting base and the engaging pins 20a, 20b 20c, 20d are projected to the second pallet from bottom of the stack of the pallets. The vertically movable frame 20 is moved upwardly by the action of the air cylinder 22 and the pallet is transferred onto the table 10. By repeating the above operations, the pallets stacked on the pallet supporting base are successively transferred into the shelves of the stocker 2.

The contents of the pallet placed on the base 21 is detected by automatically reading the bar code attached to the side wall of said pallet by means of the detector 26 and the value of detection is stored in the information processing device.

By repeating the pallet housing operations as described above, the required number of the parts for assembly and the interchangeable tools are housed in the stocker 2. Then, the vertically movable platform 4, the table 9 and the pallet trasferring device 17 are actuated by the command signal fed from the information processing device, to transfer the required one of the pallets onto the table 9. When the pallet has been transferred onto the table 9, the pins 9a of the table 9 are projected upwardly to fit into the holes 191b and 192b of said pallet, whereby the pallet is tightly suported on the table 9 and the pallet is prevented from moving transversely on said table 9.

The robot serves to pick up the parts for assembly and the interchangeable tools from the pallet positioned on the table 9 and effect the assembling operation on said bench 1a. The product, which has been assembled, is housed in a finished-product housing pallet placed in the stocker 2 or it is removed from the bench 1a by means of a product conveying mechanism (not shown).

Once the articles contained in the pallet have been used, the table 9 and the vertically movable platform 4, together with the articles remaining in the pallet, are moved to the position corresponding to an empty shelf in the stocker 2 under the control of the command signal of the information processing device, and the pallet on the table 9 is housed into said empty shelf by the action of the pallet transferring device 17. Then, the table 9 is moved to the position corresponding to a predetermined shelf in which the loaded pallet is housed, and said loaded pallet is transferred onto the table 9 by the pallet transferring device 7. By repeating the above processes in the predetermined order of the assembling and processing steps, the products are successively completed.

When the empty pallet has been returned into the stocker 2, the vertically movable platform 6 and the table 10 are driven by the command signal of the information processing device to the position corresponding to the shelf of the stocker 2 in which the empty pallet has been housed. The empty pallet is transferred onto the table 10 by the pallet transferring device 18. Then, the table 10 is moved to the position at the same level as that of the base 24 of the pallet discharging device 16 and said empty pallet is transferred onto the base 24 by the pallet transferring device 18. The engaging pins 23a, 23b and 23c, 23d are projected, so that they come into engagement with the empty pallet which has been transferred onto the pallet supporting base 24, and then the movable frame 23 is moved upwardly by the action of the air cylinder 25 with a stroke corresponding to height of one pallet and is stopped to wait for the next empty pallet. When the next empty pallet has been transferred from the table 10 onto the pallet supporting base 24, the movable frame 23 is lowered with a stroke corresponding to one pallet and the engaging pins 23a, 23b and 23c, 23d are retracted to release the pallet, so that the empty pallet is placed onto the previous empty pallet. Then the engaging pins are projected to come into engagement with the lower pallet and the pallets are moved upwardly to form a space for receiving one pallet. After a required number of the empty pallets have been stacked in the manner as described above, they are conveyed out of the base 24 by an empty pallet conveying mechanism (not shown). Thus, the base 24, the vertically movable frame 23 and the air cylinder 25 serve as a pallet discharging device as well as a pallet stacking device.

In the embodiment as described above, the stocker is shown as the one which has a rectangular shape in plan and includes two columns of shelves. However, the stocker may have any shape in plan and may include only one column of shelves or more than two columns of shelves. When the stocker includes only one column of shelves, it is not necessary to use a horizontally movable table and, consequently, it is only necessary to provide a fixed table on one vertically movable platform and a pallet transferring device. The device for transferring the loaded pallets into the stocker and the device for transferring the empty pallets out of the stocker may have any construction other than those shown in the above-described embodiment. Also, the pallet feeding device and the pallet discharging device may have constructions which are different from those shown in the drawings. For example, the loaded-pallet feeding device and the empty-pallet discharging device may be arranged one upon the other and these devices may have a plurality of stages. It is to be understood that all of these modifications in detailed construction are included within the scope of the present invention and, therefore, the present invention is not limited to the embodiment as shown in the drawings.

It will be understood from the above explanation that the present invention provides an automatic article feeding apparatus which can be realized as a highly efficient and compact automatic assembling equipment, as compared with the conventional automatic assembling equipment, and which is adaptable to the mixed-flow production wherein the intermediate size and small size lots are assembled together.

In other words the automatic article feeding apparatus according to the present invention has advantages as described below.

In the apparatus according to the present invention the stocker has a plurality of shelves and, consequently, the floor space occupied by the equipment is considerably decreased. Accordingly, the floor space of a factory and the like can be effectively used and the circumstances surrounding the machine such as robot does not get confused.

It is possible to provide an automatic assembling equipment which is highly efficient as compared with the conventional automatic assembling equipment of the type wherein the parts for assembly are loaded on the carriers moving on the conveying paths and are conveyed thereby to the automatic assembling machine.

The pallet (or box), which has been fed from the station where the parts for assembly are being actually produced, is used, as it is, in the automatic article feeding apparatus, without the need of reloading the contents of the pallet.

The apparatus according to the present invention can be applied not only to the automatic assembling equipment but also to the other type of automatic working equipment in which use is made of a robot (for example automatic machining equipment, automatic packaging machinery according to non-line system or the like).

What is claimed is:

1. An article feeding apparatus adapted to supply articles to an article assembling machine, comprising:
   a stocker having a plurality of shelves adapted to house pallets which can retain at least one article therein;
   feeding means, disposed proximate to said stocker, for receiving the pallets in a stacked state;
   separating means, disposed proximate to said feeding means, for separating at least one of the stacked pallets on said feeding means;
   moving means disposed between said stocker and said feeding means, said moving means having a supporting base which moves vertically to a position of a pallet on said feeding means, and also to a position of any desired shelf in said stocker in a vertical direction and in a horizontal direction; and
   withdrawing means, in association with said moving means, for pulling out the pallet which has been separated by said separating means onto said supporting base when said supporting base is at a position of the feeding means, and for transferring such pallet on said supporting base to said shelf when said vertically moving supporting base comes to the position of the shelf for housing the pallet of said stocker.

2. An apparatus according to claim 1, wherein said separating means comprises:
   a frame which is positioned above a platform base; and
   frame driving means for vertically moving said frame,
   wherein said frame has an engaging member for holding a portion of the stacked pallets above said platform base.

3. An article feeding apparatus adapted to feed an article to an article assembling machine, comprising:
   a stocker having a plurality of shelves adapted to house pallets which can retain at least one article therein;
   feeding means, disposed proximate to said stocker, for receiving the pallets in a stacked state;
   separating means, disposed proximate to said feeding means, for separating at least one of the stacked pallets on said feeding means;
   moving means disposed between said stocker and the article assembling machine which moves vertically to a shelf housing a pallet to be removed from said plurality of shelves to an assembling position of the article assembling machine in a vertical direction and in a horizontal direction; and
   transferring means, disposed proximate to said moving means, for transferring the pallet at said shelf to said moving means,
   wherein said moving means has a supporting base for receiving the pallet thereon and said supporting base has means for securing the pallet which has been transferred by said transferring means from said shelf.

4. An apparatus according to claim 3, wherein said securing means comprises a pin which is adapted to be received by an aperture in the pallet, wherein said pin stops the pallet at said supporting base when the pallet has been transferred by said transferring means to said supporting base of said moving means.

5. An article feeding apparatus adapted to feed an article to an article assembling machine, comprising:
   a stocker having a plurality of shelves adapted to respectively house pallets loaded with at least one article in addition to housing empty pallets after feeding the articles to the article assembling machine;
   feeding means, disposed proximate to said stocker, for receiving stacked pallets which have articles loaded thereon;
   separating means, disposed proximate to said feeding means, for separating the received stacked pallets;
   discharging means, disposed proximate to said stocker, for discharging the empty pallets from which articles have been removed by the article assembling machine; and
   moving means positioned between said feeding means as well as said discharge means and said stocker, said moving means transferring the loaded pallets on said feeding means to said stocker and providing a vertically moving supporting base for discharging the empty pallets within said shelves of said stocker to said pallet discharging means,
   wherein said vertically moving supporting base is moved by driving means in a vertical direction and in a horizontal direction in front of said shelves of said stocker; and said vertically moving supporting base has means for transferring loaded pallets and empty pallets and said transferring means transfers the loaded pallets onto said vertically moving supporting base when said moving means moves to the position of said feeding means and further transfers the loaded pallets to said shelves of said stocker, wherein said vertically moving supporting base then removes empty pallets from said shelves and transfers such empty pallets to said discharging means when said vertically moving supporting base comes to the position of said discharging means.

6. An apparatus according to claim 5, wherein said separating means comprises:
   a frame which is positioned above a platform base; and
   frame driving means for vertically moving said frame, wherein said frame has an engaging member for holding a portion of the stacked pallets above said platform base.

7. An apparatus according to claims 2 or 6, wherein each of said frames of said separating means is formed into a gate shape respectively straddling the pallets on said platform base, and said gate shaped frames are fixed to one end of a rod axially supported at said frame, said rod also being supported by a frame of said article feeding apparatus, with the other end of said rod being coupled to said frame driving means disposed on said article feeding apparatus frame.

8. An apparatus according to claim 5, wherein said discharging means further comprises:
   a supporting base for having empty pallets loaded thereon; and
   means for stacking empty pallets on said supporting base;
   wherein said stacking means has a frame positioned on said supporting base which moves vertically on said supporting base; and actuating means supported at said frame which has an engaging member for holding the pallets on said supporting base, and said stacking means stacks the empty pallets which have been transferred by said empty pallet transferring means in layers onto the pallet discharging means.

9. An apparatus according to claim 5, wherein said moving means further comprises:
   a vertically movable platform which moves up and down at an entrance and exit plane of said shelves of said stocker; and a feed screw supported by said stocker and rotated by a motor provided in parallel with said platform, wherein said vertically moving supporting base reciprocates between said separating means and said discharging means according to the rotation of said feed screw.

* * * * *

UNITED STATES PATENT AND TRADEMARK OFFICE
CERTIFICATE OF CORRECTION

PATENT NO. : 4,844,680
DATED : July 4, 1989
INVENTOR(S) : Kawata, et al.

It is certified that error appears in the above-identified patent and that said Letters Patent is hereby corrected as shown below:

COLUMN 3:

Line 20, "rails 26 and 2c" should read --rails 2b and 2c--.

COLUMN 4:

Line 45, "tcp" should read --top--.

COLUMN 5:

Line 35, "projected to" should read --projected to come into engagement with--.

COLUMN 7:

Line 19, "as robot" should read --as a robot--.

Signed and Sealed this

Fourth Day of September, 1990

*Attest:*

HARRY F. MANBECK, JR.

*Attesting Officer*      *Commissioner of Patents and Trademarks*